US007463296B2

(12) United States Patent
Sun et al.

(10) Patent No.: US 7,463,296 B2
(45) Date of Patent: *Dec. 9, 2008

(54) DIGITAL CAMERAS WITH LUMINANCE CORRECTION

(75) Inventors: Jian Sun, Beijing (CN); Jiaya Jia, Kowloon (HK); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

This patent is subject to a terminal disclaimer.

(21) Appl. No.: 10/817,008

(22) Filed: Apr. 1, 2004

(65) Prior Publication Data

US 2005/0219391 A1 Oct. 6, 2005

(51) Int. Cl.
*H04N 5/202* (2006.01)
*H04N 5/235* (2006.01)

(52) U.S. Cl. .................. 348/254; 348/234; 348/362; 382/274

(58) Field of Classification Search ............... 348/255, 348/234; 382/274
See application file for complete search history.

(56) References Cited

U.S. PATENT DOCUMENTS

| 5,101,276 | A | * | 3/1992 | Ohta ................. 348/221.1 |
| 5,450,502 | A | | 9/1995 | Eschbach et al. |
| 5,982,926 | A | | 11/1999 | Kuo et al. |
| 6,075,889 | A | * | 6/2000 | Hamilton et al. ........... 382/167 |
| 6,101,272 | A | | 8/2000 | Noguchi |
| 6,198,844 | B1 | | 3/2001 | Nomura |
| 6,463,173 | B1 | | 10/2002 | Tretter |
| 6,556,704 | B1 | * | 4/2003 | Chen ................. 382/154 |
| 6,636,646 | B1 | | 10/2003 | Gindele |
| 6,760,485 | B1 | | 7/2004 | Gilman et al. |
| 6,807,299 | B2 | | 10/2004 | Sobol |
| 6,807,319 | B2 | | 10/2004 | Kovvuri et al. |
| 6,879,731 | B2 | * | 4/2005 | Kang et al. ............ 382/274 |
| 6,885,492 | B2 | * | 4/2005 | DeSimone et al. ......... 359/290 |
| 6,937,775 | B2 | | 8/2005 | Gindele et al. |
| 6,993,200 | B2 | | 1/2006 | Tastl et al. |
| 7,075,569 | B2 | | 7/2006 | Niikawa |
| 2003/0133019 | A1 | * | 7/2003 | Higurashi et al. ......... 348/218.1 |
| 2003/0137597 | A1 | | 7/2003 | Sakamoto et al. |
| 2003/0174886 | A1 | | 9/2003 | Iguchi et al. |
| 2004/0017487 | A1 | * | 1/2004 | Ueda .................. 348/222.1 |
| 2004/0234152 | A1 | | 11/2004 | Liege et al. |
| 2007/0070223 | A1 | * | 3/2007 | Tamaru et al. ............ 348/255 |

(Continued)

OTHER PUBLICATIONS

Ben-Ezra, M., Nayar, S. K.; "Motion Deblurring Using Hybrid Imaging", CVPR Jul. 2003, pp. 1-8.

(Continued)

*Primary Examiner*—Lin Ye
*Assistant Examiner*—Hung H Lam
(74) *Attorney, Agent, or Firm*—Lee & Hayes, PLLC

(57) ABSTRACT

Techniques are disclosed to improve quality of images that may be blurred or underexposed (e.g., because of camera shake, taken in dim lighting conditions, or taken of high action scenes). The techniques may be implemented in a digital camera, digital video camera, or a digital camera capable of capturing video. In one described implementation, a digital camera includes an image sensor, a storage device, and a processing unit. The image sensor captures two images from a same scene which are stored on the storage device. The processing unit enhances the captured images with luminance correction.

36 Claims, 14 Drawing Sheets

U.S. PATENT DOCUMENTS

2007/0206246 A1* 9/2007 Tsuruoka et al. ............ 358/521

OTHER PUBLICATIONS

"Eye-Controlled Auto-Focus" Published on Canon Malaysia's Corporate Website, Published at least as early as Mar. 2004. 3 pages.

"Lightening-Fast Technology: Combatting te Effects of Camera Shake" Published on Nikon Web Magazine at least as early as Mar. 2004, 5 pages.

Reinhard, E., Ashikhmin, M., Gooch, B.; "Color Transfer Between Images" IEEE Computer Graphics and Applications, Sep./Oct. 2001, pp. 34-41.

Ruderman, D. L., Cronin, T. W., Chiao, C.-C.; "Statistics of Cone Responses to Natural Images: Implications for Visual Coding" Journal of the Optical Society of America vol. 15, No. 8, Aug. 1998, pp. 2036-2045.

Reinhard, E., Stark, M., Shirley, P., Ferwerda, J.; "Photographic Tone Reproduction for Digital Images" Proceedings of the 29th annual conference on Computer graphics and interactive techniques San Antonio, Texas 2002. pp. 267-276.

Rav-Acha, A., Peleg, S.; "Restoration of Multiple Images with Motion Blur in Different Directions" Fifth IEEE Workshop on Applications of Computer Vision Dec. 4-6, 2000 Palm Springs, California, p. 22 (7 pgs).

Liu, X., El Gamal, A.; "Simultaneous Image Formation and Motion Blur Restoration via Multiple Capture" ICASSP'2001 conference, Salt Lake City, Utah, May 2001. 4 pages.

Kundur, D., Hatzinakos, D.; "A Novel Blind Deconvolution Scheme for Image Restoration Using Recursive Filtering" IEEE Transactions on Signal Processing, vol. 46, No. 2, Feb. 1998, pp. 375-390.

Grossberg, M. D., Nayar, S. K.; "What can be Known about the Radiometric Response from Images?" ECCV (4) 2002: pp. 189-205.

Bascle, et al., "Motion Deblurring and Super-resolution from an Image Sequence" 1996, pp. 10.

Fabian, et al., "Robust Identification of Motion and Out-of-Focus Blur Parameters from Blurred and Noisy Images" vol. 53, Issue 5, Sep. 1991 pp. 40-412.

Yitzhaky, et al., "Direct Method for Restoration of Motion-blurred Images" Journal of the Optical Society of America, vol. 15, Issue 6, Jun. 1998 pp. 1512-1519.

Yitzhaky, et al., "Restoration of an Image Degraded by Vibrations Using Only a Single Frame" Optical Engineering, vol. 39, Issue 8, Aug. 2000, pp. 2083-2091.

* cited by examiner $I_L$ $I_H$ $I_C$

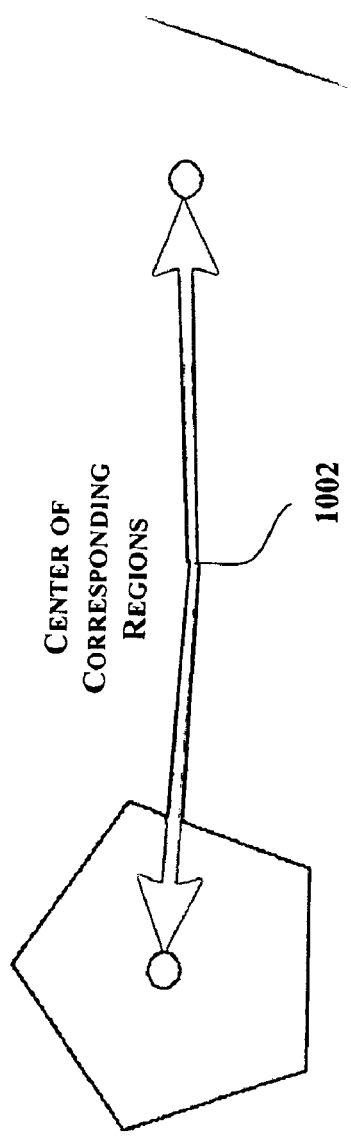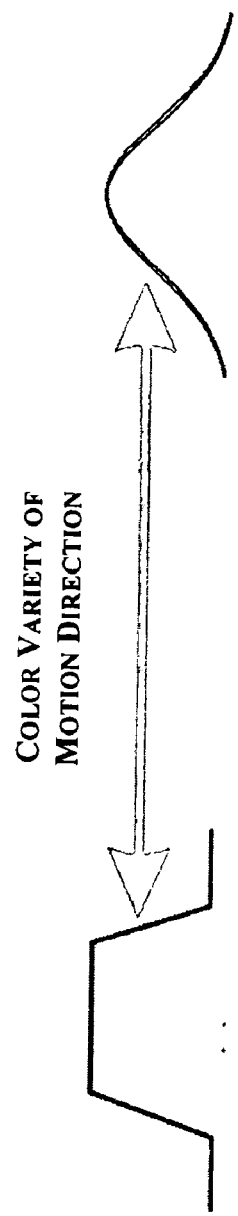
FIG. 10A  FIG. 10B  FIG. 11A  FIG. 11B

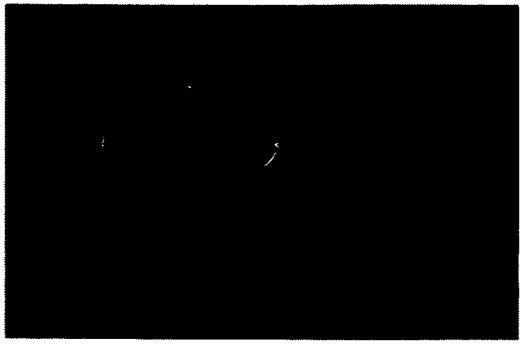
FIG. 16          FIG. 17
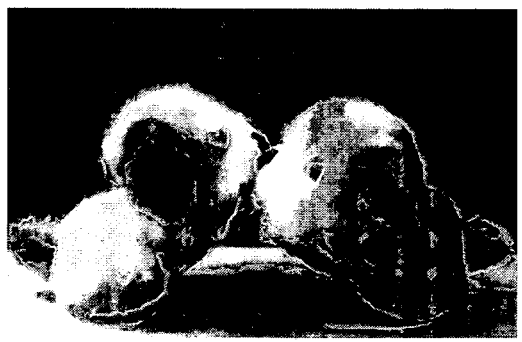
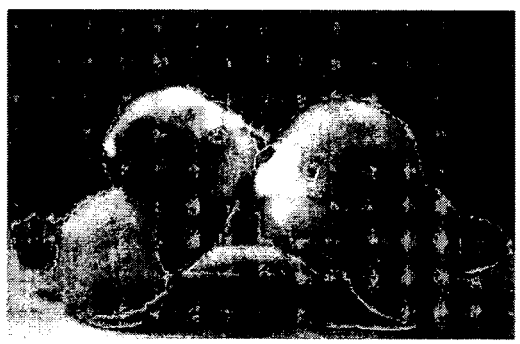
FIG. 18          FIG. 19
FIG. 20          FIG. 21

FIG. 29
FIG. 30
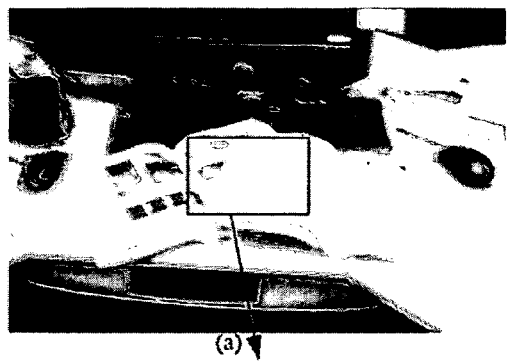
(a)
(b)
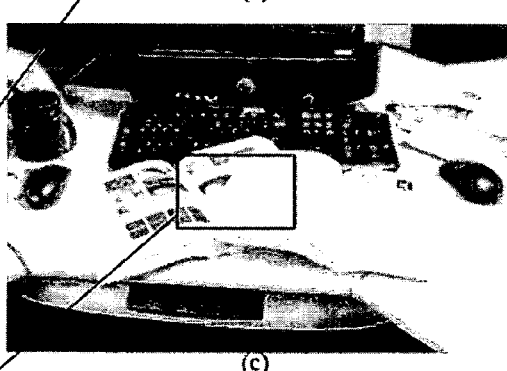
(c)
FIG. 31
FIG. 32

DIGITAL CAMERAS WITH LUMINANCE CORRECTION

TECHNICAL FIELD

The present invention generally relates to image processing, and more particularly, to digital cameras with luminance correction.

BACKGROUND

When photographing a scene, light rays emitted from objects within the scene are recorded on a film such as regular film or digital film. Hence, photography involves the recording of these light rays. When lighting conditions are improper (e.g., when photographing in low light), pictures lack some of the scene information when compared with pictures taken in sufficient lighting conditions.

Taking satisfactory photos under dim lighting conditions has historically posed a very difficult problem. Often, the images are blurred and/or underexposed. Underexposures generally results from not exposing the film to sufficient amounts of light. Underexposure may be somewhat corrected by exposing the film for a longer period, for example, by using a lower shutter speed to keep the shutter open for a longer period. Lower shutter speed, however, results in blurring. The blurring problem is exasperated when using a hand-held camera (e.g., rather than a tripod), in part, because of the increased movement during shutter openings. Blurring may also occur due to movement of the objects within the scene during shutter openings.

A couple of common solutions include use of flashes (to compensate for low lighting by introducing additional lighting) or a film with higher ISO (a prefix set by the International Organization for Standardization).

Using flashes is limiting for a variety of reasons. For example, flashes are only operational over relatively short distances. Also, flashes may result in change of colors, yielding an inaccurate representation of the scene. Multiple flashes (e.g., with remote activation) may be utilized to improve the results of flash photography, but setting up several flashes around a scene may not always be feasible (e.g., in outdoor photography or when capturing shots with short notice).

Higher ISO film is also limiting for a number of reasons. In traditional photography, the film is often only changeable one roll at a time. Accordingly, when a camera is loaded with higher ISO film (e.g., suitable for low lighting conditions), the camera can not be used for normal lighting conditions without limiting the photographers options (e.g., where pictures have to be taken at higher shutter speeds to avoid overexposure). In digital photography, the performance of higher ISO settings entirely depends on the camera sensor, which can significantly vary between different cameras. Moreover, an even more important shortcoming is the relatively higher amount of noise that results from using the higher ISO.

Currently, there are several techniques for improving the quality of blurred images, e.g., resulting from an exposure time above the safe shutter speed. Generally, the safe shutter speed is a speed no slower than the reciprocal of the focal length of the lens. These techniques can be roughly classified into in-process and post-process approaches which limit motion blur due to, for example, a long exposure time, camera shake, or object movement.

In-process approaches are mainly hardware-based techniques, where lens stabilization is achieved by camera shake compensation. Alternatively, high-speed digital cameras (such as those with complementary metal oxide semiconductor (CMOS) sensors) can perform high-speed frame captures within normal exposure time which allows for multiple image-based motion blur restoration. The in-process techniques are able to produce relatively clear and crisp images, given a reasonable exposure time. However, they require specially designed hardware devices.

On the other hand, post-process methods can be generally considered as motion deblurring techniques. Among them, blind deconvolution is widely adopted to enhance a single blurred image, which may be applied under different assumptions on the point spread function (PSF). Alternatively, several images with different blurring directions or an image sequence can be used, in more general situations, to estimate the PSF. In both cases, due to the discretization and quantization of images in both spatial and temporal coordinates, the PSF can not be reliably estimated, which produces a result inferior to the ground truth image (which is an image either taken with a camera on a tripod or of a static scene with correct exposure). A hybrid imaging system consisting of a primary (high spatial resolution) detector and a secondary (high temporal resolution) detector has also been proposed. The secondary detector provides more accurate motion information to estimate the PSF; thus, making deblurring possible even under long exposure. However, this technique needs additional hardware support, and the deblurred images are still not visibly as good as the ground truth in detail.

Accordingly, the present solutions fail to provide sufficient image quality.

SUMMARY

Techniques are disclosed to improve quality of images that may be blurred or underexposed (e.g., because of camera shake, taken in dim lighting conditions, or taken of high action scenes). The techniques may be implemented in a digital camera, digital video camera, or a digital camera capable of capturing video.

In one described implementation, a digital camera includes an image sensor, a storage device, and a processing unit. The image sensor captures two images from a same scene which are stored on the storage device. The processing unit enhances the captured images with luminance correction.

In another described implementation, the luminance correction includes determining a spatial coherence and color statistics of the first and second images. The determined color statistics and spatial coherence is utilized to enhance an underexposed one of the first and second images.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 10A shows a homogeneous region from an original image, while FIG. 10B shows the same region taken with motion blur.

FIGS. 11A and 11B illustrate curves of pixel colors along one direction.

FIG. 16 illustrates a sample input underexposed image.

FIG. 17 illustrates an exemplary image resulting from application of luminance correction to the image of FIG. 16.

FIG. 18 illustrates an exemplary result when applying color transfer techniques to the image of FIG. 16.

FIG. 19 illustrates an exemplary result with adaptive histogram equalization applied to the image of FIG. 16.

FIG. 20 illustrates an exemplary result when Gamma correction of 2.5 is applied to the image of FIG. 16.

FIG. 21 illustrates an exemplary result with curve adjustment applied to the image of FIG. 16 in a photo editing program.

Sample images associated with a high contrast scene implementation are shown in FIGS. 29-32.

Figure 33:
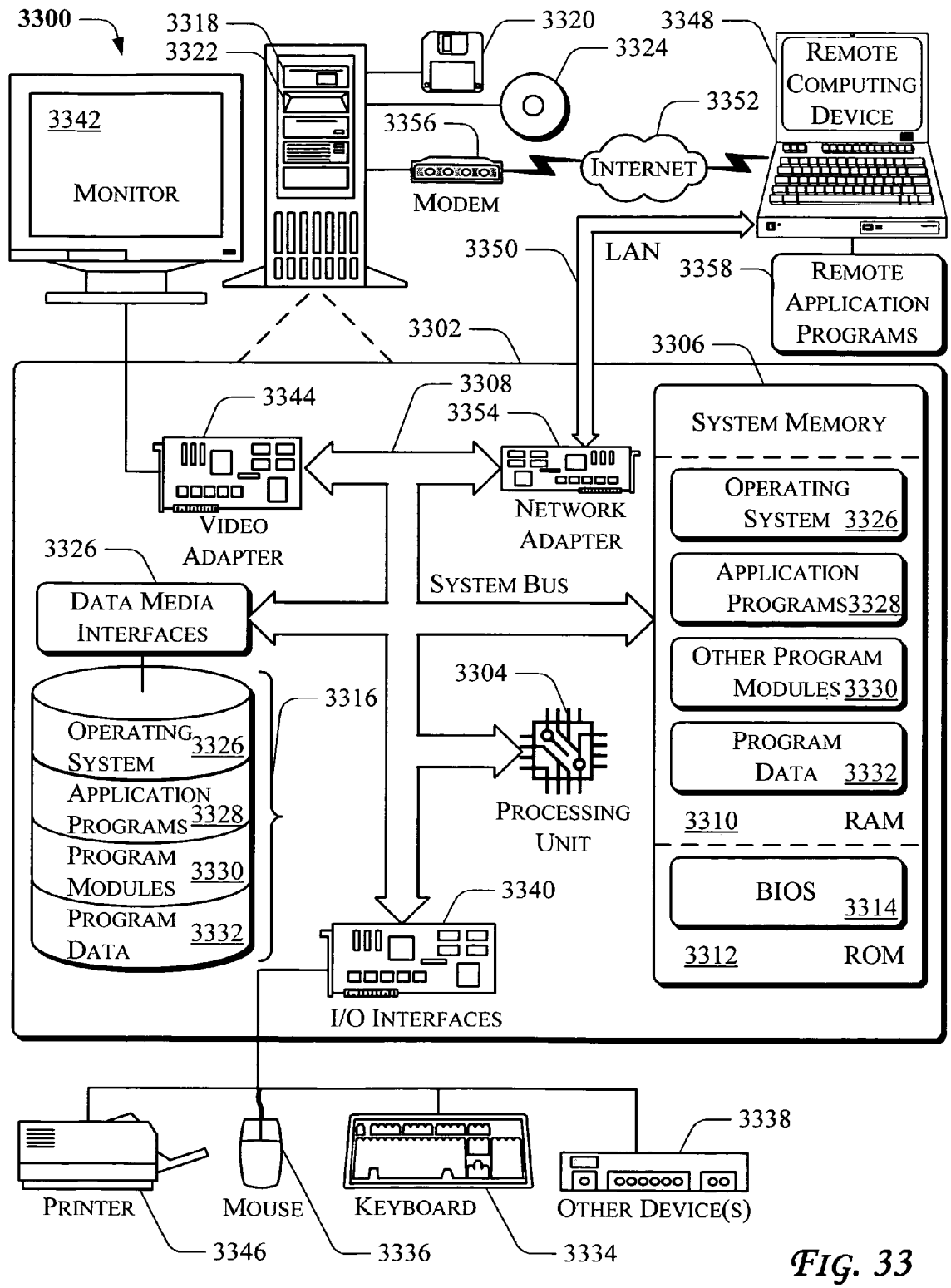

FIG. 33 illustrates a general computer environment, which can be implement the techniques described herein.

DETAILED DESCRIPTION

The following disclosure describes techniques for improving the quality of images that may be blurred or underexposed (e.g., because of camera shake, taken in dim lighting conditions, or taken of high action scenes). Two pictures are taken of a same scene with different exposure intervals. Hence, one image can be underexposed and the other can be blurred. The information within these two images is used to provide a high-quality image of the scene without visible blurring or darkness. The two pictures may be taken within a short interval, for example, to ensure that the center of the images do not move significantly or to limit the affects of motion by the camera or movement of objects within the scene.

The techniques may be readily extended to handle high contrast scenes to reveal fine details in saturated regions (as will be discussed with reference to FIGS. 22-25). Furthermore, some of the techniques may be directly incorporated into a digital camera, digital video camera, or a digital camera capable of capturing video. For example, a digital camera may be configured to keep its shutter open while taking the two pictures (as will be further discussed with reference to FIGS. 1, 4, and 8).

Digital Camera Configuration

Figure 1:
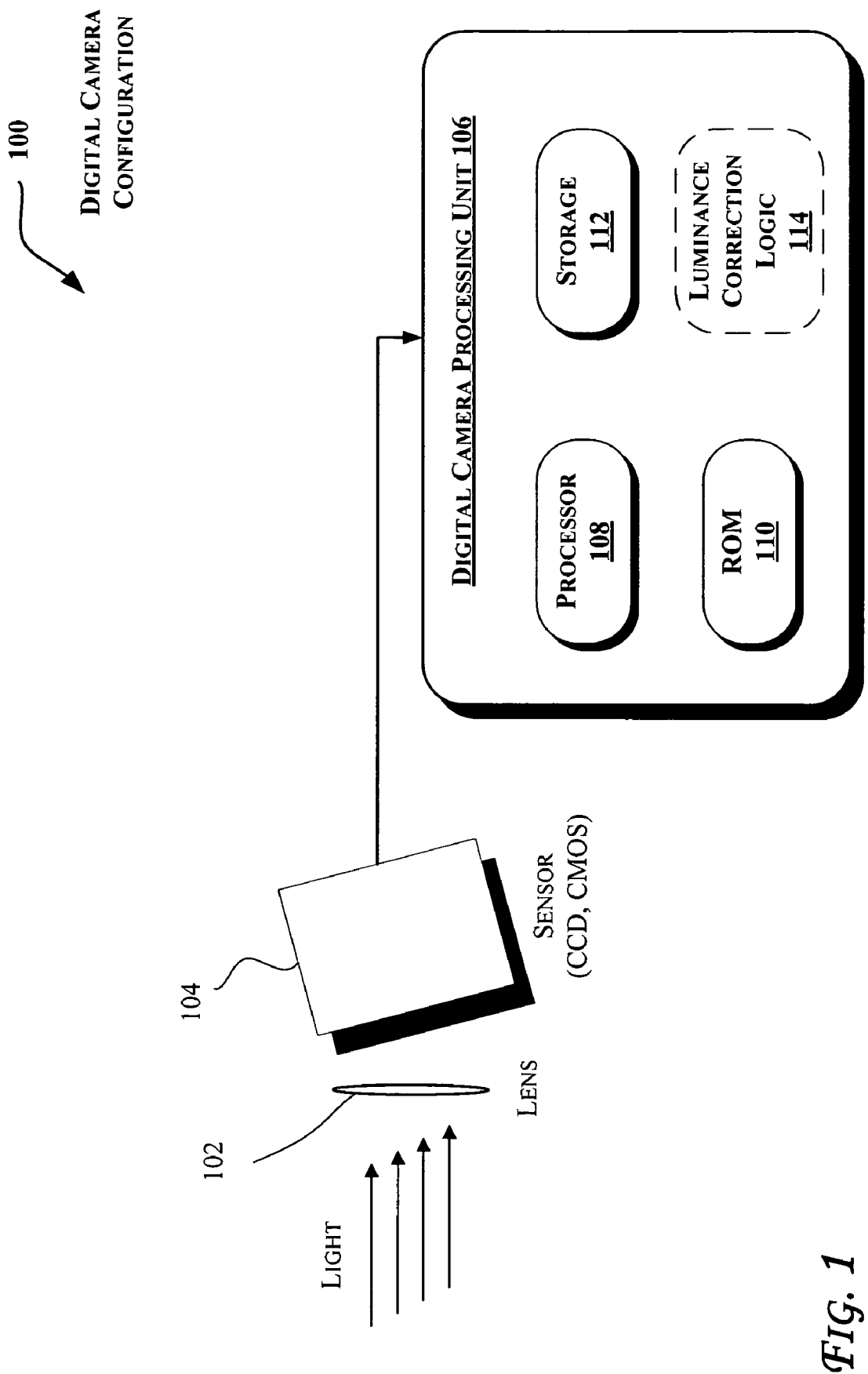
FIG. 1 illustrates an exemplary digital camera configuration for taking multiple shoots that may be utilized to provide luminance correction.

FIG. 1 illustrates an exemplary digital camera configuration 100 for taking multiple shoots that may be utilized to provide luminance correction. The camera may be a stand-alone camera or a camera incorporated into another device (such as a personal digital assistant (PDA), a cell phone, and the like). The configuration 100 includes a lens 102 which is exposed to light rays. Multiple lens configurations may be utilized to capture the light rays such as different types of lenses (e.g., zoom, fish eye, wide angle, etc.).

Also, the configuration may further include an optional shutter (not shown). The shutter may control exposure of a sensor 104 to the light rays entering through the lens 102. Accordingly, the shutter may be located between the sensor 104 and the lens 102. The shutter may be activated by a button on the camera or remotely (e.g., by an infra red or radio frequency remote control). Two pictures may be taken by the camera by pressing a shutter button a single time (e.g., so that luminance correction may be applied to the images as will be further discussed herein, for example, with reference to FIG. 4 or 8). The sensor 104 may be a CMOS or a charge-coupled device (CCD).

In an implementation, the sensor 104 may be activated (e.g., powered) as needed without requiring a physical barrier (such as the shutter). Moreover, a more simplified mechanism (such as a sensor cover) may be utilized to protect the lens 102 and the sensor 104 from environmental elements (e.g., strong sun rays, dust, water, humidity, and the like).

The digital camera configuration 100 further includes a digital camera processing unit 106 that is coupled to the sensor 104. The processing unit 106 includes a processor (108) and storage (110 and 112) to receive, store, and/or process the images captured by the sensor 104 (as will be further discussed herein, e.g., with reference to FIG. 4). It is envisioned that multiple processors (108) may be utilized, for example, to provide speed improvements. Also, the processing unit (106) or processors (108) may be specially designed for imaging applications.

As illustrated, the processing unit 106 may include non-volatile memory, such as read only memory (ROM) (110). In one implementation, the data stored on the ROM 110 is utilized to provide camera settings, boot information, and the like (e.g., during start-up or upon request). Instead of or in addition to the ROM 110, flash memory may be utilized to allow changes. Also, other forms of rewritable storage may be used such as electrically erasable programmable read-only memory (EEPROM). Furthermore, the storage 112 may contain data and/or program modules that are accessible to and/or presently operated on by the processor 108 as will be further discussed with reference to FIG. 2.

The digital camera configuration 100 may include other removable/non-removable, volatile/non-volatile computer storage media (not shown). By way of example, a hard disk drive or other non-volatile magnetic media (e.g., a "floppy disk"), an optical disk drive (such as a compact disc ROM (CD-ROM) and/or digital versatile disk (DVD)), a tape (e.g., in case of digital video cameras), and the like may be utilized to provide storage to the digital camera configuration 100.

Figure 2:
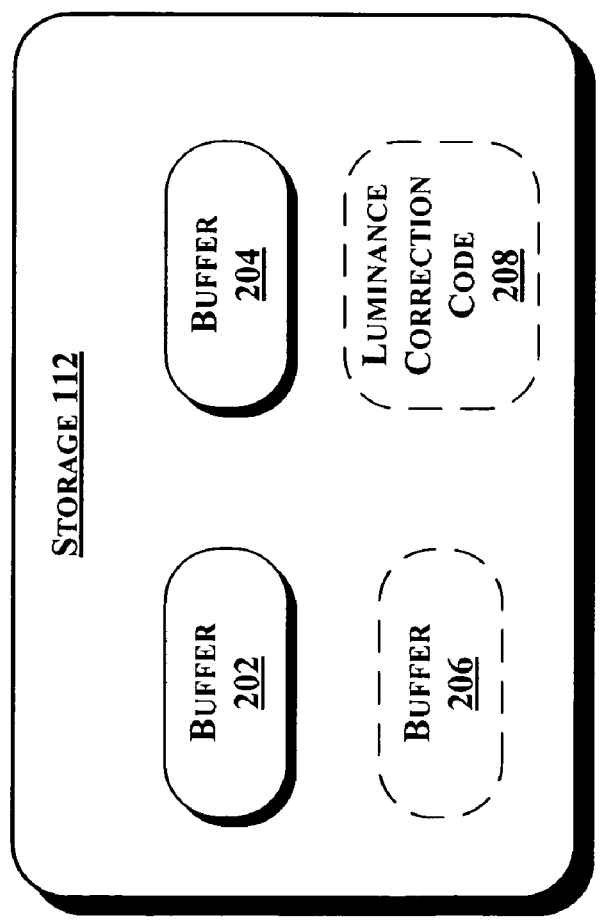
FIG. 2 illustrates an exemplary storage configuration for storing image data captured by the sensor shown in FIG. 1.
Figure 4:
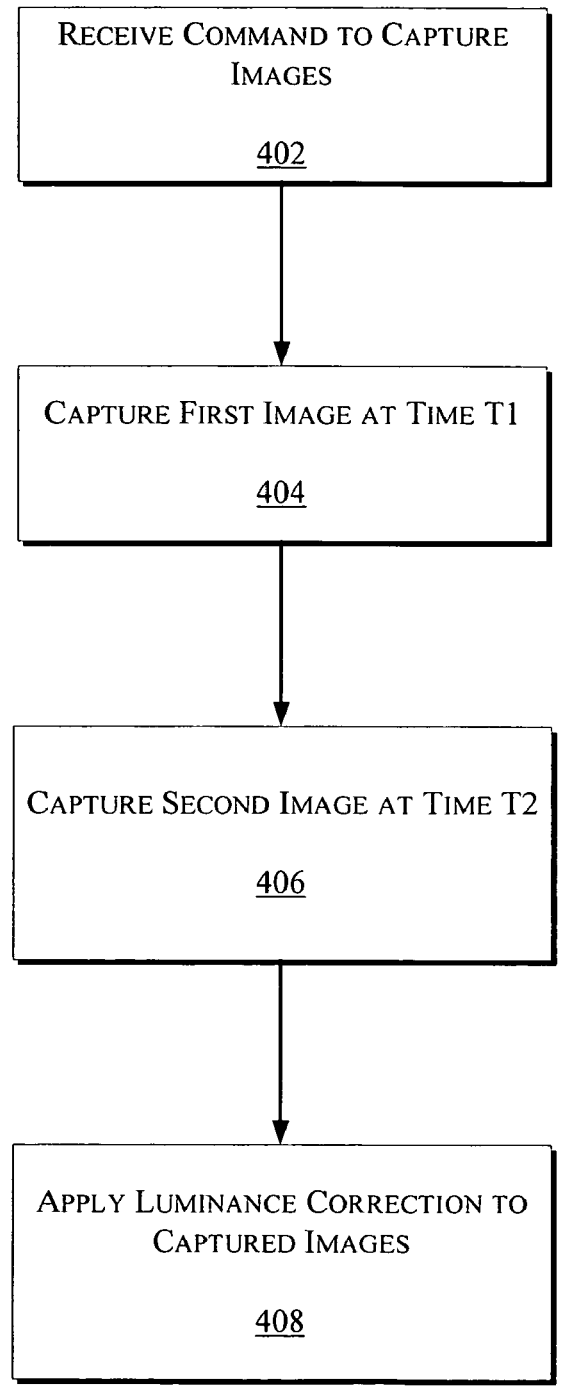
FIG. 4 illustrates an exemplary method for providing luminance correction in digital cameras.
Figure 8:
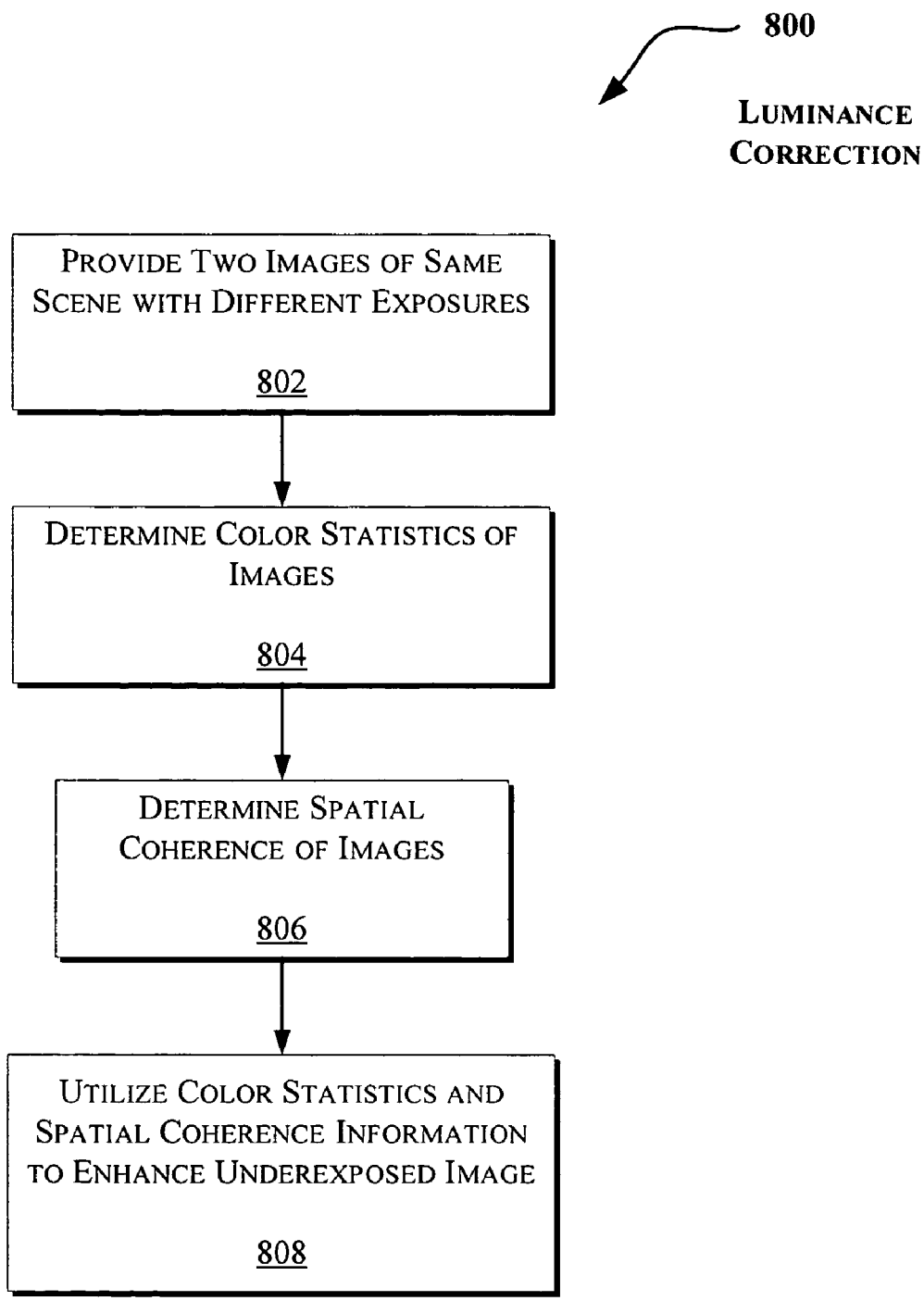
FIG. 8 illustrates an exemplary method for luminance correction.

The digital camera configuration 100 may optionally include a luminance correction logic 114 to apply luminance correction to captured images as will be further discussed herein, for example, with reference to FIGS. 2, 4, and 8. The luminance correction logic 114 may be implemented as an application-specific integrated circuit (ASIC), a programmable logic array (PLA), and the like.

In an implementation, the digital camera configuration 100 may utilize one or more external hardware facilities (such as computing environment discussed with reference to FIG. 33) to process and/or store data instead of or in addition to the digital camera processing unit 106. In such an implementation, the digital camera configuration 100 may also be controlled by the external hardware facility. This setup may free the photographer from manually changing the camera parameters between shots to enable the photographer to focus on shooting the best pictures. Data may be exchanged with the external hardware facility through a wired connection (e.g., universal serial bus (USB), fire wire (e.g., IEEE 1394), and the like) and/or wireless connection (e.g., 802.11 (and its varieties), cellular network, radio frequency, etc.).

FIG. 2 illustrates an exemplary storage 112 for storing image data captured by the sensor 104 of FIG. 1. The storage 112 includes at least two buffers or caches (202 and 204) for storing two successive shots captured (e.g., by the digital camera discussed with reference to FIG. 1). Alternatively, the buffers (202 and 204) may be implemented logically (i.e., physically located on a same memory device but logically separate). The processor 108 of FIG. 1 may have access to the buffers (202 and 204) to permit processing of the captured images, for example, for luminance correction (see, e.g., FIG. 4).

The storage 112 may include additional buffers (206), for example, to provide data caching while manipulating the captured images. Additional buffers may also be utilized to store newly captured images while the previously captured images are manipulated. Also, the storage 112 may optionally store luminance correction code or instructions 208 (e.g., in a buffer or a separate memory device). In such an implementation, the processor 108 may access the luminance correction code 208 to perform luminance correction (see, e.g., FIGS. 4 and 8).

Figure 3:
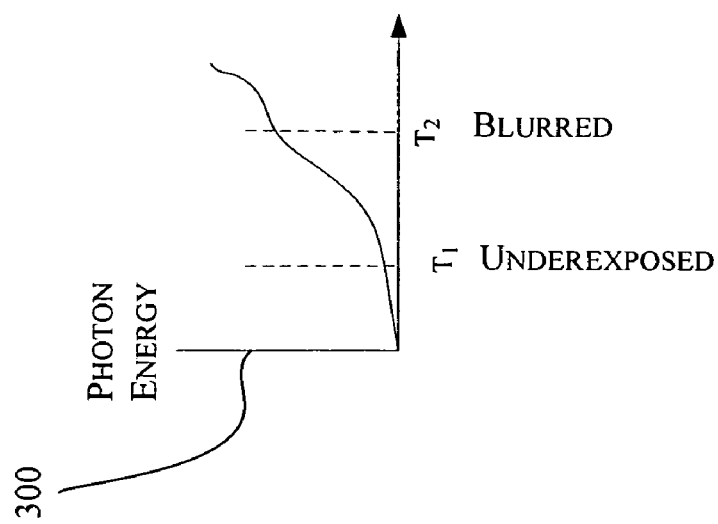
FIG. 3 illustrates an exemplary graph indicating how photon energy captured by the sensor of FIG. 1 may increase over time.

FIG. 3 illustrates an exemplary graph 300 indicating how photon energy captured by the sensor 104 of FIG. 1 may increase over time (e.g., from T1 to T2). For example, at time T1, the sensor image may be underexposed in dim lighting conditions (as discussed with reference to FIG. 5). Also, at time T2 (e.g., ½ second after time T1), the sensor image may be blurred (e.g., due to motion by camera, objects within the scene, etc.) as discussed with reference to FIG. 6. This difference in the exposure may be used in one implementation to provide luminance correction as will be further discussed with reference to FIG. 4 below.

Luminance Correction in Digital Cameras

FIG. 4 illustrates an exemplary method 400 for providing luminance correction in digital cameras. The method 400 may be implemented as software, hardware, firmware, or combinations thereof within a digital camera such as that discussed with reference to FIG. 1.

Upon receiving a command to capture images (402), e.g., by pressing a button on a stand-alone digital camera or a camera incorporated into another device (such as a PDA, a cell phone, and the like), the camera sensor (e.g., 104 of FIG. 1) is exposed to light rays. A first image is captured at a time T1 (406). The time T1 may be that discussed with reference to graph 300 of FIG. 3. Accordingly, the first image may be underexposed (e.g., $I_L$ of FIG. 5).

A second image is then captured at a time T2 (406) of the same scene. The time T2 may be that discussed with reference to graph 300 of FIG. 3. Accordingly, the second image may be blurred (e.g., $I_H$ of FIG. 6). In an implementation, an exposure bracketing feature of a digital camera may be utilized for capturing the two images. Moreover, some cameras already include exposure bracketing (e.g., Canon G-model and some Nikon Coolpix model digital cameras) which takes multiple pictures at different shutter speeds by pressing the shutter button a single time. However, using the present built-in camera functionality has some limitations. Namely, it does not operate in manual mode, and the difference of shutter speeds can be limited.

Figure 7:
FIG. 7 illustrates an exemplary high-quality image where luminance correction is applied.

Luminance correction is then applied to the captured images (408) such as discussed herein (see, e.g., FIG. 8) to provide a high quality image (e.g., $I_C$ of FIG. 7).

In digital cameras with shutters, the shutter is left open to capture both an underexposed and a blurred image of the same scene. Such an implementation may ensure that any motion (e.g., from camera or objects within the scene) is limited. Also, leaving the shutter open may also improve speed (i.e., no lag time for intermediate shutter operation) and/or quietness (e.g., for taking nature shots).

In one implementation, software for performing luminance correction (408) may be provided through a general-purpose computer (such as that discussed with reference to FIG. 33). The computer may be directly coupled to the camera (e.g., FIG. 1) or a memory card from the camera may be later linked to the computer to make the images available for processing.

In a further implementation, the method 400 is implemented in a digital video camera (or a digital camera capable of capturing video). The video camera may be high-speed camera (e.g., capturing about 45 to 60 frames per second). The sensor of the camera (e.g., 104 of FIG. 1) may be reconfigured for every frame/field to adjust integration time, exposure timing, and/or analog to digital conversion (ADC) gain. Alternatively, two or more sensors with different settings may be utilized to capture successive images.

Sample Images

Figure 5:
FIGS. 5 and 6 illustrate images taken of a same scene under dim lighting conditions.
Figure 6:

FIGS. 5 and 6 illustrate images taken of a same scene under dim lighting conditions. As illustrated, the image of FIG. 5 ($I_L$) is underexposed and the image of FIG. 6 ($I_H$) is blurred. The images of FIGS. 5 and 6 have different exposure intervals. As illustrated, the image of FIG. 5 ($I_L$) has a longer exposure time than the image of FIG. 6 ($I_H$). Techniques discussed herein can utilize the images shown in FIGS. 5 and 6 to construct a high-quality image ($I_C$) such as shown in FIG. 7, e.g., by applying luminance correction further discussed below with reference to FIG. 8.

Image Acquisition

In one implementation, to exploit the tradeoff between the exposure time and the blurring degree of the captured images, the two input images may be taken using the same capture device (e.g., a camera) with the following exposure settings:

One image (e.g., $I_L$ of FIG. 5) is taken with exposure time around the safe shutter speed, producing an underexposed image where motion blur is largely reduced. Since this image ($I_L$) is too dark, the colors in the image are not acceptable.

The other image (e.g., $I_H$ of FIG. 6) is an image acquired under an extended exposure time. The color and brightness of this image is acceptable. However, it is motion blurred because of camera shaking or moving objects in the scene.

In situations where movement of the scene (or objects within the scene) and/or capturing device (e.g., handheld camera without a tripod) is possible, the two pictures may be taken within a short interval. If the time lapse is kept as short as possible, the differences between the two images are minimized and/or the regional match of the positions of each pixel is maximized.

Luminance Correction

FIG. 8 illustrates an exemplary method 800 for luminance correction. After two images of the same scene are provided (802), such as discussed with reference to FIGS. 5 and 6 (e.g., $I_L$ and $I_H$), the color statistics (804) and spatial coherence (806) of the images are determined (as will be described in more detail below in sections with similar titles). As discussed with reference to FIGS. 5 and 6, $I_L$ and $I_H$ are two images of the same scene with different exposure intervals. Therefore, they are related not only by the color statistics, but also by the corresponding spatial coherence.

The color statistics and spatial coherence information is utilized (808) to enhance the underexposed image (e.g., $I_L$ of FIG. 5) in color space to provide a normally exposed high quality image (e.g., $I_C$ of FIG. 7). More specifically, the stage 808 utilizes a color mapping approach in one implementation. The color mapping is constrained by spatial details determined from the underexposed image and, thus, differs from and improves on previous pure color transfer techniques. As will be further discussed in more detail below, by properly formulating color statistics and spatial constraints, and incorporating them into a Bayesian framework, a maximum a posterior (MAP) solution provides an optimal color mapping function in the color space that preserves structural details while enhancing pixel colors simultaneously.

Furthermore, the method 800 may deal with camera shake and object movement at the same time, and in a unified framework. Moreover, change of object topology or object deformation can also be handled, which is difficult for most deblurring methods, since different parts of the object have different PSFs. In addition, by slightly modifying one constraint (as will be further discussed under "color statistics in high contrast scenes"), the method 800 can be extended to deal with high contrast scenes and produce images with captured fine details in highlight or saturated areas.

In an implementation, the method 800 is readily applied in low light conditions where artificial light sources such as flashes are not present (e.g., because of power consumption limitations such as in compact cameras, PDAs, cameras integrated into watches, pens, etc.), undesired (such as capturing images of biological matter where presence of light may result in undesired biological phenomena), or otherwise impractical (e.g., due to distances or environmental conditions as in traffic control cameras). Examples where artificial lighting is undesired may include cameras attached to microscopes, electronic microscopes, etc.

Relationship between $I_L$ and $I_H$

As discussed with reference to FIGS. 5-6, $I_L$ and $I_H$ are two images of the same scene with different exposure intervals. Therefore, they are related not only by the color statistics, but also by the corresponding spatial coherence. Their relationship may be translated into constraints for inferring a color mapping function in a Bayesian framework.

In an implementation, the underexposed image $I_L$ can be regarded as a sensing component in normally exposed image $I_H$ in the temporal coordinates. This makes it possible to reasonably model the camera or scene (or scene object) movement during the exposure time, and constrain the mapping process which will be further described in the next sections.

Color Statistics

In RGB (red, green, and blue) color space, important color statistics can often be revealed through the shape of a color histogram. A histogram is generally a representation of a frequency distribution by means of rectangles or bars whose widths represent class intervals and whose areas are proportional to the corresponding frequencies. Thus, the histogram can be used to establish an explicate connection between $I_H$ and $I_L$. Moreover, since high irradiance generates brighter pixels, the color statistics in $I_L$ and $I_H$ can be matched in order from lower to higher in pixel intensity values. Accordingly, the histogram of $I_L$ ($h_{I_L}$) may be reshaped such that:

$$g(h_{I_L}) \doteq h_{I_H} \quad (1)$$

In (1), $g(\bullet)$ is the transformation function performed on each color value in the histogram, and $h_{I_H}$ is the histogram of $I_H$. A common way to estimate $g(\bullet)$ is adaptive histogram equalization, which normally modifies the dynamic range and contrasts of a image according to a destination curve.

This histogram equalization may not produce satisfactory results in some situations though. More specifically, the quantized 256 (single byte accuracy) colors in each channel may not be sufficient to accurately model the variety of histogram shapes.

Figure 9:
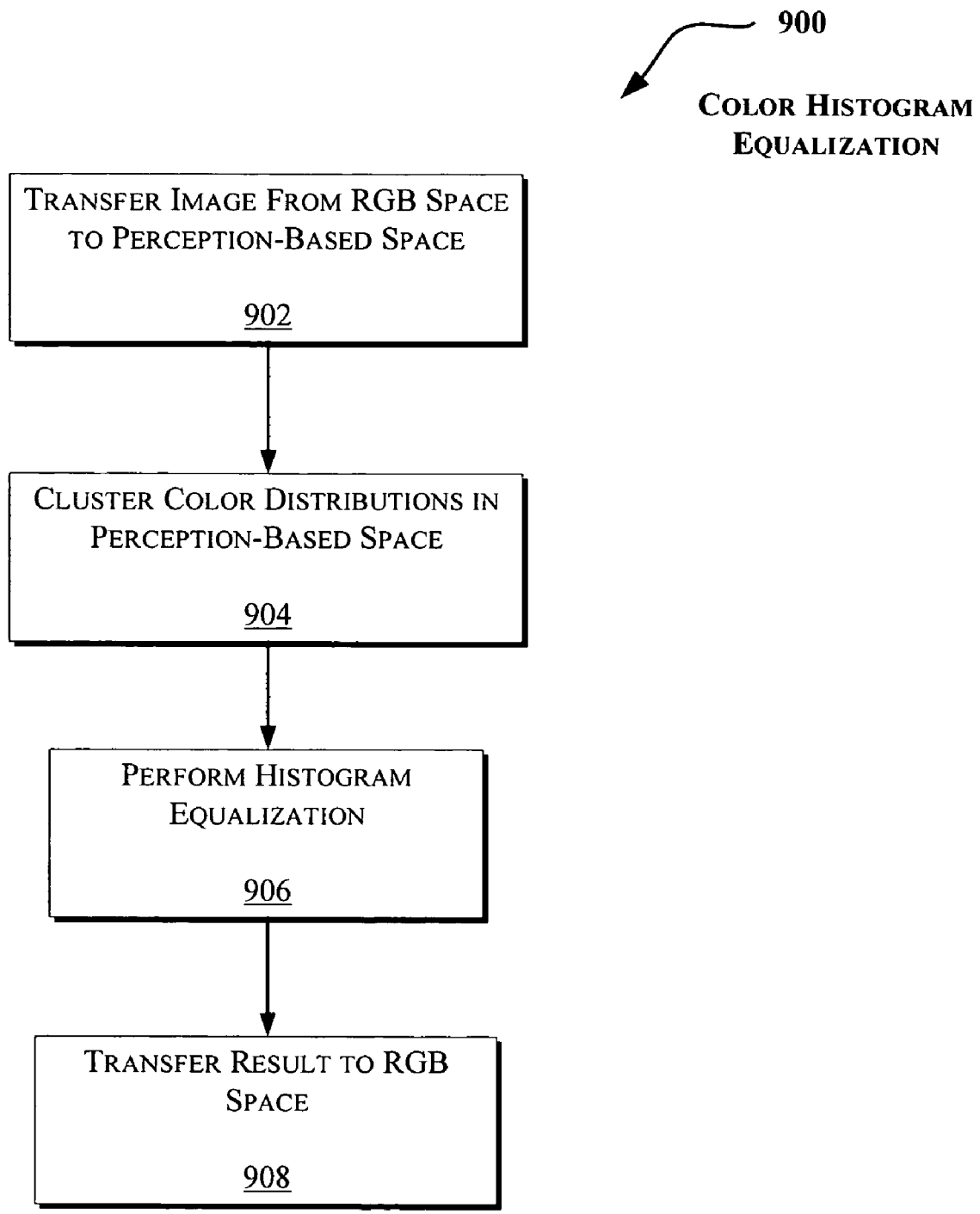
FIG. 9 illustrates an exemplary method for color histogram equalization which may be utilized in luminance correction.

FIG. 9 illustrates an exemplary method 900 for color histogram equalization which may be utilized in luminance correction. More specifically, the method 900 may be utilized to optimally estimate the transformation function. First, the image from RGB space is transferred to a perception-based color space $l\alpha\beta$ (902), where the l is the achromatic channel, and $\alpha$ and $\beta$ contain the chromaticity value. In this way, the image is transformed to a more discrete space with known phosphor chromaticity.

The color distributions in the new color space are clustered into 65,536 (double byte precision) portions (904). Histogram equalization is then performed in the new color space (906). The result of the histogram equalization (906) is transferred back to the RGB space (908).

By performing this transformed histogram equalization on the two images (e.g., FIGS. 5-6), the two images may be related entirely in their color space. However, the color statistics is largely dependent on the image quality of the camera. For example, if the darker image contains a large amount of noise, the contaminated information may need to be treated first (e.g., by filtering the image).

Spatial Constraint

The color statistics described above does not consider any temporal coherence between $I_H$ and $I_L$. However, since the two images are taken of the same scene, there is a strong spatial constraint between $I_H$ and $I_L$.

In a situation where a region contains similar color pixels, FIG. 10A shows a homogeneous region from the original image, while FIG. 10B shows the same region taken with motion blur. The dots 1002 mark the region centers. The corresponding curves of FIGS. 11A and 11B illustrate pixel colors along one direction. From FIGS. 10A, 10B, 11A, and 11B, it can be observed that the color toward the center of the region is less affected by blurring, given that the region area is sufficiently large and homogeneous. Additionally, the consistency of colors in the region allows matching of the color of central pixels.

Figure 12:
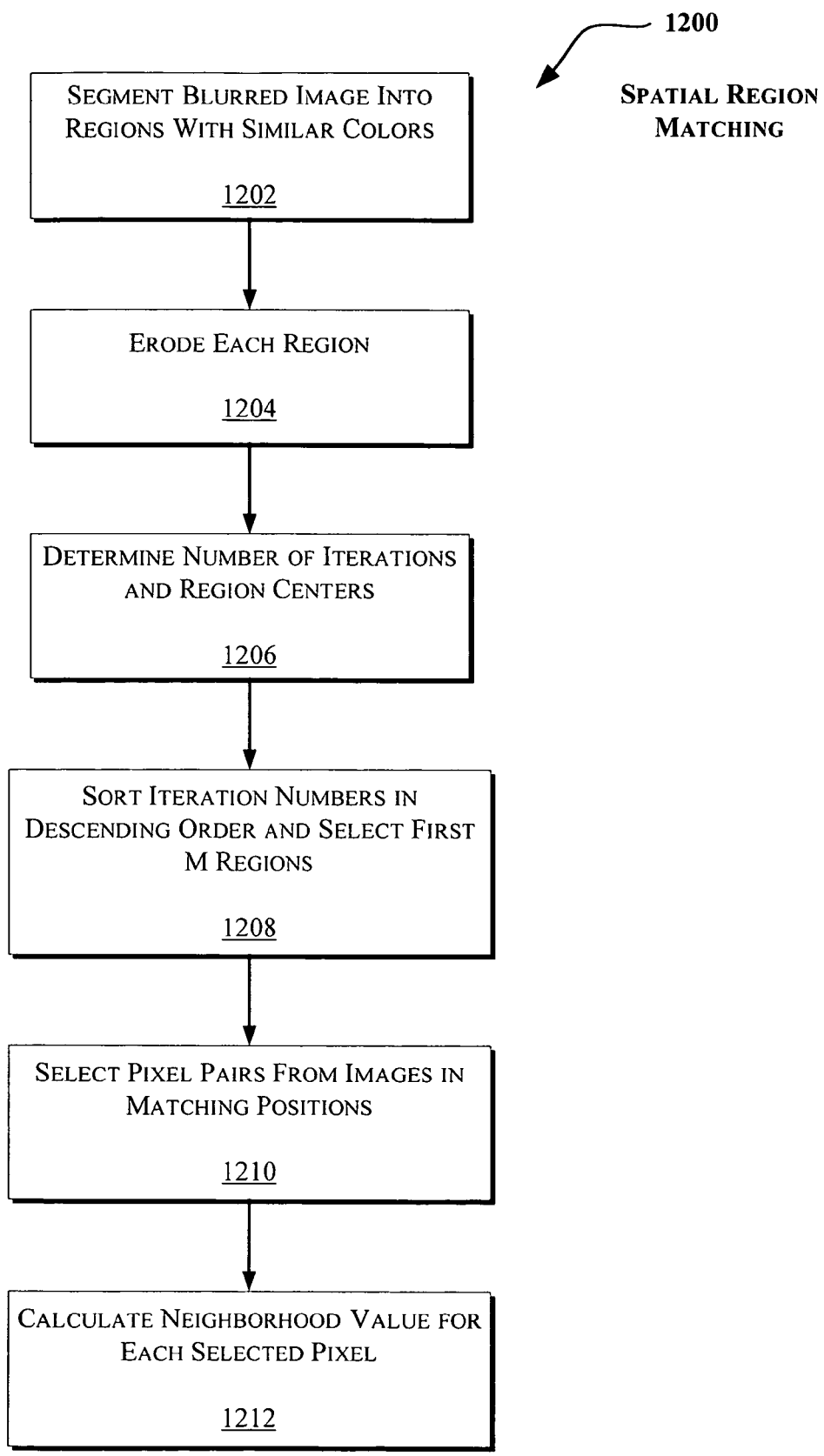
FIG. 12 illustrates an exemplary spatial region matching method which may be utilized in luminance correction.
Figure 13:
FIG. 13 illustrates a sample segmentation of the image of FIG. 6 into regions.

FIG. 12 illustrates an exemplary spatial region matching method 1200 which may be utilized in luminance correction. The method 1200 may be used to select matching seeds in $I_H$ and $I_L$. The blurred image (e.g., $I_H$ of FIG. 6) is segmented into regions such that each region $R_m(I_H)$ contains similar colors (1202). A sample segmentation of FIG. 6 into regions is shown in FIG. 13.

Figure 14:
FIG. 14 illustrates an exemplary intermediate image resulting from eroding the regions within the image of FIG. 13.

To sort the regions according to the homogeneity and size, each region $R_m(I_H)$ is eroded (1204) and the number of iterations to completely erode each region and the region centers which are the last few pixels in the eroding process for each region are determined (1206). The same morphological eroding operation may be performed for each region $R_m(I_H)$ in one implementation. FIG. 14 illustrates an exemplary intermediate image resulting from eroding the regions within the image of FIG. 13.

Figure 15:
FIG. 15 illustrates the selected region centers of FIGS. 13 and 14 as dots.

The iteration numbers are sorted in descending order and the first M regions are selected as the most possible candidates for region matching (1208). As a result, the positions of these region centers are selected as matching positions. From the images $I_H$ and $I_L$, pixel pairs $\{c_L^m, c_H^m\}$ in the matching position are selected (1210) and the value for each $c^m$ is calculated as a Gaussian average of the colors of neighboring pixels (1212), where the variance is proportional to the iteration numbers. The selected region centers are illustrated in FIG. 15 as dots (1502). As illustrated, the dots (1502) are located in the largest and most homogeneous M regions.

The matching process (1200) implies that an ideal color mapping function should be able to transform some matching seeds colors in $I_L$ to those in $I_H$. In the next section, a Bayesian framework is described which incorporates the two constraints (color and spatial) into consideration, so as to infer a constrained mapping function.

Constrained Mapping Function

The color mapping function may be defined as $f(l_i) = l'_i$, where $l_i$ and $l'_i$ are color values in two sets, respectively. Accordingly, the resulting image $I_C$ is built by applying $f(\cdot)$ to the underexposed image $I_L$: $I_C(x,y) = f(I_L(x,y))$, where $I_k(x,y)$ is pixel values in image $I_k$. Note that the form of $f(\cdot)$ is constrained by both $I_L$ and $I_H$.

In Bayesian framework, one maximizes the a posterior probability (MAP) to infer $f^*$ given the observations from $I_L$ and $I_H$:

$$f^* = \arg\max_f p(f \mid I_L, I_H) \quad (2)$$

In the previous sections, two kinds of connections between $I_L$ and $I_H$ were observed. One is color statistics which can be described by two histograms $h_{I_L}$ and $h_{I_H}$ of $I_L$ and $I_H$, respectively. The other is the region matching constraint which can be represented by a number of M corresponding matching color seeds $\{c_L^m, c_H^m\}_{m=1}^M$ between $I_L$ and $I_H$. These relationships may be regarded as constraints and equation (2) may be rewritten as:

$$f* = \arg\max_f p(f \mid h_{I_L}, h_{I_H}, \{c_L^m, c_H^m\}_{m=1}^M) \quad (3)$$
$$= \arg\max_f p(h_{I_L}, h_{I_H}, \{c_L^m, c_H^m\}_{m=1}^M \mid f) p(f)$$

The next sections defines the likelihood $p(h_{I_L}, h_{I_H}, \{c_L^m, c_H^m\}_{m=1}^M \mid f)$ and the prior $p(f)$.

Likelihood

Since global matching is performed in a discrete color space, $f$ is approximated by a set of discrete values $f = \{f1, f2, \ldots, fi, \ldots, fN\}$, where N is the total number of bins in the color space. Hence, the likelihood in equation (3) can be factorized under the independent and identically distributed (IID) assumption:

$$p(h_{I_L}, h_{I_H}, \{c_L^m, c_H^m\}_{m=1}^M \mid f) = \prod_{i=1}^N p(g(l_i), \{c_L^{-i}, c_H^{-i}\} \mid f_i) \quad (4)$$

In equation (4), $g(l_i)$ is a function to transform $h_{I_L}$ to $h_{I_H}$ at color value $l_i$. The $c_L^{-i}$ is the most similar color to $l_i$ in color seeds set $\{c_L^m\}_{m=1}^M$, and $c_H^{-i}$ is the corresponding color of $c^{L-i}$ in color seed pairs.

According to the analysis in the previous sections, $g(l_i)$ and $\{c_L^{-i}, c_H^{-i}\}$ are two constraint factors for each $f_i$. Both of their properties should be maintained on the mapping function. As a consequence, the two constraints may be balanced and the likelihood may be modeled as follows:

$$p(g(l_i), \{c_L^{-i}, c_H^{-i}\} \mid f_i) \propto \exp\left(-\frac{\|f_i - (\alpha g(l_i) + (1-\alpha) c_L^{-i})\|^2}{2\sigma_l^2}\right) \quad (5)$$

In equation (5), the scale $\alpha$ weights the two constraints, and $\sigma_l^2$ is a variance to model the uncertainty of the two kinds of constraints. As the value of $\alpha$ grows, the confidence of the matching seed pairs drops. The $\alpha$ may be related to the following factors:

The distance $\|l_i - c_L^{-i}\|$. A large distance indicates a weak region matching constraint, which makes $\alpha$ approach 1. Hence, the $\alpha$ is inversely proportional to this distance.

The uncertainty of correspondence in matching color pair $\{c_L^{-i}, c_H^{-i}\}$. As depicted in the previous sections, the larger the matching region size is, the larger confidence one can get from the region center for the matching colors. Hence, the uncertainty $\sigma_c$ may be defined to be proportional to the region size for each matching color. Combining these two factors, the $\alpha$ may be defined as:

$$\alpha = \exp\left(\frac{\sigma_c^2 \|l_i - c_L^{-i}\|^2}{2\beta^2}\right) \quad (6)$$

In equation (6), $\beta$ is the scale parameter to control the influence of $\alpha$.

Prior

As a prior, the monotonic constraint may be enforced on $f(\cdot)$, which maintains the structural details in $I_L$. In addition, to avoid abrupt change of the color mapping for neighboring colors, it may be required that $f(\cdot)$ be smooth in its shape in an implementation. In another implementation, the second derivative of $f$ may be minimized as follows:

$$p(f) \propto \exp\left(-\frac{1}{2\sigma_f^2} \int (f'')^2\right) \quad (7)$$
$$\propto \exp\left(-\frac{1}{2\sigma_f^2} \sum_i (f_{i-1} - 2f_i + f_{i+1})^2\right)$$

In equation (7), the $\sigma_f^2$ is the variance to control the smoothness of $f$.

Map Solution

Combining the log likelihood of equation (4) and the log prior in equation (7), the optimization problem may be solved by minimizing the following log posterior function:

$$E(f) = -\sum_i \log p(g(l_i), \{c_L^{-i}, c_H^{-i}\} \mid f_i) - \log p(f) \quad (8)$$

In equation (8), the E($f$) is a quadratic objective function. Therefore, the global optimal mapping function $f(\cdot)$ can be obtained by the singular value decomposition (SVD). Although the monotonic constraint is not enforced explicitly in equation (7), the smoothness constraint is sufficient to construct the final monotonic $f$ in an implementation.

Other Sample Results

The techniques described herein are applied to difficult scenarios to show the efficacy of the approach. The results are classified into different groups as follows: FIG. 16 illustrates a sample input underexposed image; FIG. 17 illustrates an exemplary image resulting from application of the luminance correction of the present application to the image of FIG. 16; FIG. 18 illustrates an exemplary result when applying color transfer techniques; FIG. 19 illustrates an exemplary result with adaptive histogram equalization; FIG. 20 illustrates an exemplary result when Gamma correction of 2.5 is applied; and FIG. 21 illustrates an exemplary result with curve adjustment applied in a photo editing program. As can be seen, better visual quality and more details are achieved by using the constraints described herein (i.e., FIG. 17).

Also, the two constraints described herein (spatial and color) are both beneficial in an implementation. They optimize the solution in two different aspects. Therefore, the combination and balance of these constraints may guarantee the visual correctness of the methodology described herein in one implementation.

Motion Blur Caused by Hand-Held Camera

Figure 22:
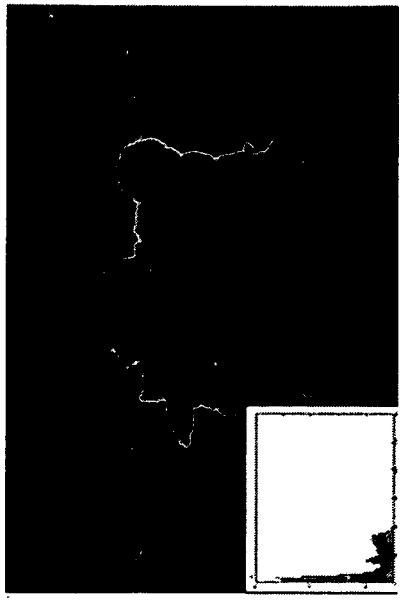
FIGS. 22-25 illustrate the ability of the methodologies described herein to optimally combine the color information of two input images with varying exposure periods.
Figure 23:
Figure 24:
Figure 25:

The rock example of FIGS. 22-25 illustrates the ability of the methodologies described herein to optimally combine the color information of the two input images (i.e., those of FIGS. 22 and 23). The histogram of each image is shown in the lower left side of each figure. Unlike other deblurring methods, the resulting edges are crisp and clear. The two input images are taken with shutter speeds $\frac{1}{40}$s and $\frac{1}{3}$s, respectively. FIGS. 24 and 25 are the color mapped image ($I_C$) and ground truth with their corresponding histograms, respectively. The ground truth image (FIG. 25) is taken by using a tripod. Note that the images are visually and statistically close in FIGS. 24 and 25.

Motion Blur Caused by Movement of Objects

Figures 26, 27, 28:
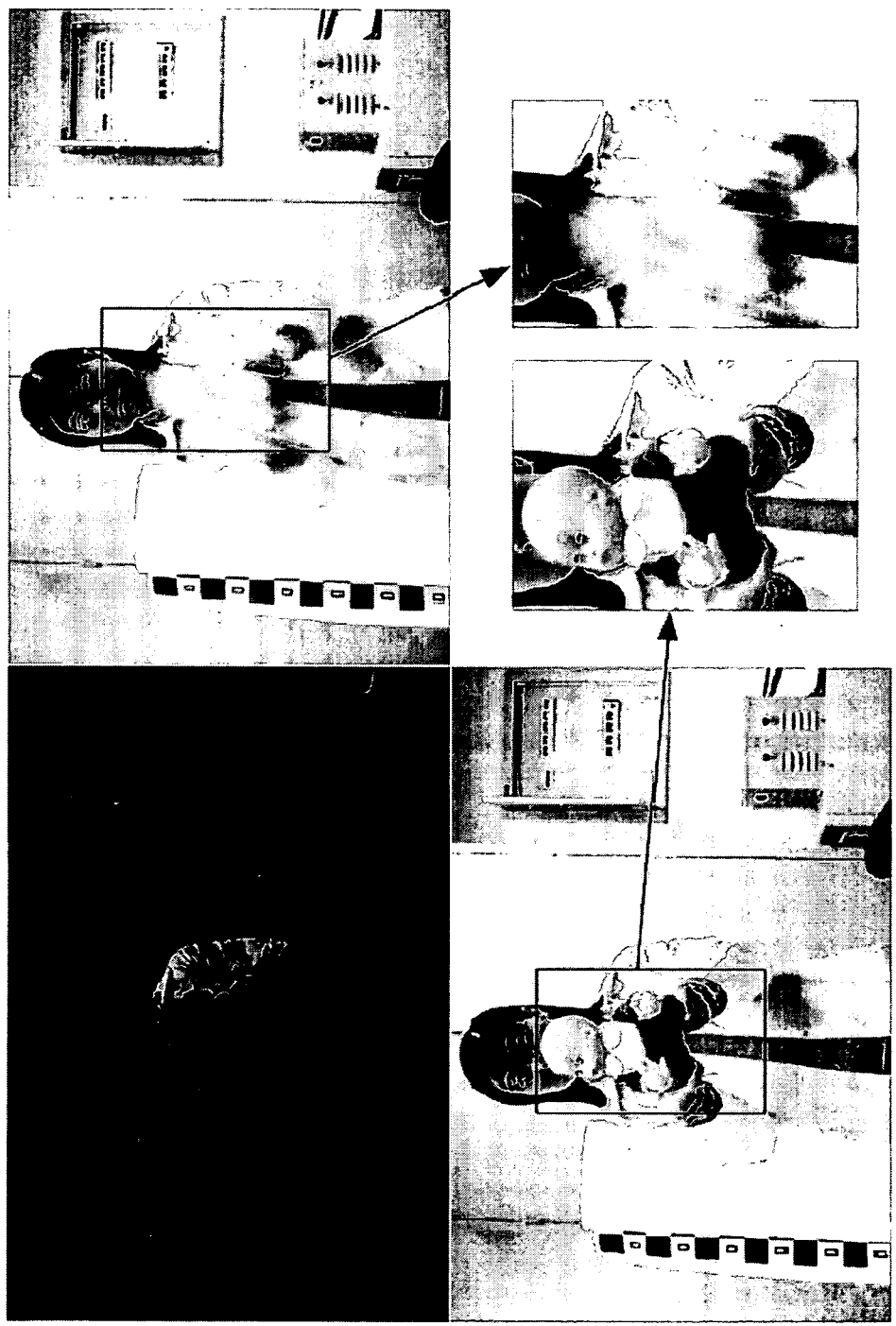
FIGS. 26-28 illustrate results of an experiment with motion blur caused by movement of objects within a scene.

In an implementation, the techniques discussed herein can easily solve object movement or deformation problems (e.g., if the object movement is too fast in normal exposure interval). FIGS. 26-28 illustrate results of an experiment. As illustrated, portions of FIGS. 27 and 28 are enlarged for ease of reference. The input normal exposure image is locally blurred (FIG. 27), i.e., PSF has no uniform representation in the whole image, which easily makes deconvolving methods fail. Using the techniques discussed herein (and the underexposed image of FIG. 26), the camera shutter speed may be reduced by four stops. As a result, a high quality image ($I_C$) with largely reduced blurring effect can be generated (FIG. 28).

Color Statistics in High Contrast Scenes

Where the images are taken of a high contrast scene, bright regions will become saturated in $I_H$. Histogram equalization faithfully transfers colors from $I_L$ to $I_H$, including the saturated area, which not only degrades the spatial detail in the highlight region, but also generates abrupt changes in the image color space.

To solve this problem, the color mapping function $g(\cdot)$ described in the previous sections may be modified to cover a larger range. In one implementation, a color transfer technique may be utilized to improve the image quality in high contrast situations. This technique also operates on an image histogram, which transfers the color from the source image to the target by matching the mean and standard deviation for each channel. It has no limit on the maximum value of the transferred color since the process is a Gaussian matching.

In an implementation, all non-saturated pixels in $I_H$ are used for color transfer to $I_L$. After applying the color transfer technique, the mapping result of $I_L$ exceeds the color depth (that is, above 255), and extends the saturated pixels to larger color values. Hence, a higher range image is constructed to reveal details in both bright and dark regions.

Sample images associated with such an implementation are shown in FIGS. 29-32. As illustrated, portions of FIGS. 29-32 are enlarged for ease of reference. FIGS. 29 and 30 illustrate the input images ($I_H$ and $I_L$, respectively). The image of FIG. 31 is reconstructed by setting $g(\cdot)$ as the original histogram equalization function. FIG. 32 is a result with enhanced colors and details by modifying $g(\cdot)$ to use the color transfer method. Tone mapping is also performed to present the image illustrated in FIG. 32.

General Computer Environment

FIG. 33 illustrates a general computer environment 3300, which can be used to implement the techniques described herein. For example, the computer environment 3300 may be utilized to run the software program that controls an image capture device (such as a camera). The computer environment 3300 is only one example of a computing environment and is not intended to suggest any limitation as to the scope of use or functionality of the computer and network architectures. Neither should the computer environment 3300 be interpreted as having any dependency or requirement relating to any one or a combination of components illustrated in the exemplary computer environment 3300.

Computer environment 3300 includes a general-purpose computing device in the form of a computer 3302. The components of computer 3302 can include, but are not limited to, one or more processors or processing units 3304 (optionally including a cryptographic processor or co-processor), a system memory 3306, and a system bus 3308 that couples various system components including the processor 3304 to the system memory 3306.

The system bus 3308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 3302 typically includes a variety of computer-readable media. Such media can be any available media that is accessible by computer 3302 and includes both volatile and non-volatile media, removable and non-removable media.

The system memory 3306 includes computer-readable media in the form of volatile memory, such as random access memory (RAM) 3310, and/or non-volatile memory, such as ROM 3312. A basic input/output system (BIOS) 3314, containing the basic routines that help to transfer information between elements within computer 3302, such as during start-up, is stored in ROM 3312. RAM 3310 typically contains data and/or program modules that are immediately accessible to and/or presently operated on by the processing unit 3304.

Computer 3302 may also include other removable/non-removable, volatile/non-volatile computer storage media. By way of example, FIG. 33 illustrates a hard disk drive 3316 for reading from and writing to a non-removable, non-volatile magnetic media (not shown), a magnetic disk drive 3318 for reading from and writing to a removable, non-volatile magnetic disk 3320 (e.g., a "floppy disk"), and an optical disk drive 3322 for reading from and/or writing to a removable, non-volatile optical disk 3324 such as a CD-ROM, DVD, or other optical media. The hard disk drive 3316, magnetic disk drive 3318, and optical disk drive 3322 are each connected to the system bus 3308 by one or more data media interfaces 3326. Alternatively, the hard disk drive 3316, magnetic disk drive 3318, and optical disk drive 3322 can be connected to the system bus 3308 by one or more interfaces (not shown).

The disk drives and their associated computer-readable media provide non-volatile storage of computer-readable instructions, data structures, program modules, and other data for computer 3302. Although the example illustrates a hard disk 3316, a removable magnetic disk 3320, and a removable optical disk 3324, it is to be appreciated that other types of computer-readable media which can store data that is accessible by a computer, such as magnetic cassettes or other magnetic storage devices, flash memory cards, CD-ROM, DVD or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 3316, magnetic disk 3320, optical disk 3324, ROM 3312, and/or RAM 3310, including by way of example, an operating system 3326, one or more application programs 3328, other program modules 3330, and program data 3332. Each of such operating system 3326, one or more application programs 3328, other program modules 3330, and program data 3332 (or some combination thereof) may implement all or part of the resident components that support the distributed file system.

A user can enter commands and information into computer 3302 via input devices such as a keyboard 3334 and a pointing device 3336 (e.g., a "mouse"). Other input devices 3338 (not shown specifically) may include a microphone, joystick, game pad, satellite dish, serial port, scanner, and/or the like. These and other input devices are connected to the processing unit 3304 via input/output interfaces 3340 that are coupled to the system bus 3308, but may be connected by other interface and bus structures, such as a parallel port, game port, or a universal serial bus (USB). The USB port may be utilized to connect a camera or a flash card reader (such as discussed with reference to FIG. 29) to the computer environment 3300.

A monitor 3342 or other type of display device can also be connected to the system bus 3308 via an interface, such as a video adapter 3344. In addition to the monitor 3342, other output peripheral devices can include components such as speakers (not shown) and a printer 3346 which can be connected to computer 3302 via the input/output interfaces 3340.

Computer 3302 can operate in a networked environment using logical connections to one or more remote computers, such as a remote computing device 3348. By way of example, the remote computing device 3348 can be a personal computer, portable computer, a server, a router, a network computer, a peer device or other common network node, game console, and the like. The remote computing device 3348 is illustrated as a portable computer that can include many or all of the elements and features described herein relative to computer 3302.

Logical connections between computer 3302 and the remote computer 3348 are depicted as a local area network (LAN) 3350 and a general wide area network (WAN) 3352. Such networking environments are commonplace in offices, enterprise-wide computer networks, intranets, and the Internet.

When implemented in a LAN networking environment, the computer 3302 is connected to a local network 3350 via a network interface or adapter 3354. When implemented in a WAN networking environment, the computer 3302 typically includes a modem 3356 or other means for establishing communications over the wide network 3352. The modem 3356, which can be internal or external to computer 3302, can be connected to the system bus 3308 via the input/output interfaces 3340 or other appropriate mechanisms. It is to be appreciated that the illustrated network connections are exemplary and that other means of establishing communication link(s) between the computers 3302 and 3348 can be employed.

In a networked environment, such as that illustrated with computing environment 3300, program modules depicted relative to the computer 3302, or portions thereof, may be stored in a remote memory storage device. By way of example, remote application programs 3358 reside on a memory device of remote computer 3348. For purposes of illustration, application programs and other executable program components such as the operating system are illustrated herein as discrete blocks, although it is recognized that such programs and components reside at various times in different storage components of the computing device 3302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may include "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, DVDs, or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

For example, the luminance correction techniques discussed herein may be readily applied to non-color images (e.g., grayscale images).

What is claimed is:

1. A digital camera comprising:
   an image sensor to capture a first image and a subsequent second image of a same scene using different exposure intervals, wherein one of the first and second captured images is underexposed, and wherein another of the first and second captured images is blurred;
   a storage device to store the captured images; and
   a processing unit coupled to the storage device to enhance the underexposed one of the first and second captured images with luminance correction to generate a resulting image of the scene which appears focused and properly exposed, wherein the luminance correction comprises:
      determining a spatial coherence and color statistics of the first and second images; and
      utilizing the determined color statistics and spatial coherence to enhance the underexposed one of the first and second images.

2. A digital camera as recited in claim 1, wherein the processing unit comprises one or more processors coupled to the storage device.

3. A digital camera as recited in claim 1, wherein the processing unit comprises at least one processor coupled to the storage device and the storage device stores instructions executed by the at least one processor which enhance the underexposed one of the first and second captured images with luminance correction.

4. A digital camera as recited in claim 1, wherein the processing unit is implemented as an application-specific integrated circuit (ASIC) or a programmable logic array (PLA).

5. A digital camera as recited in claim 1, wherein the digital camera is coupled to an external computing device to perform one or more acts comprising: controlling the digital camera, accessing data stored on the storage device, and receiving data from the image sensor.

6. A digital camera as recited in claim 1, wherein the storage device is external to the digital camera.

7. A digital camera as recited in claim 1, wherein the storage device comprises a plurality of storage devices.

8. A digital camera as recited in claim 1, wherein the digital camera is a device selected from a group comprising a digital camera, a digital video camera, and a digital camera capable of capturing video.

9. A digital camera as recited in claim 1, wherein no artificial light is present while the first or second images are captured.

10. A digital camera as recited in claim 1, wherein the image sensor remains exposed to light between the capturing of the first and second images.

11. A digital camera as recited in claim 1, wherein the image sensor is exposed to light in response to a capture command.

12. A digital camera as recited in claim 1, wherein the first and second images are taken in a dim lighting condition.

13. A digital camera as recited in claim 1, wherein the first image is underexposed.

14. A digital camera as recited in claim 1, wherein the second image is blurred.

15. A digital camera as recited in claim 1, wherein both the first and second images are captured using an exposure bracketing feature when a shutter button is pressed, wherein the first image is underexposed, and wherein the second image is blurred.

16. A digital camera as recited in claim 1, wherein the image sensor is selected from a group comprising a CCD and a CMOS.

17. A digital camera as recited in claim 1, wherein the digital camera is integrated into a device selected from a group comprising a cell phone, a watch, and a PDA.

18. A digital camera as recited in claim 1, wherein the luminance correction comprises modifying a color mapping function of the first and second images to cover a larger range for a high contrast scene.

19. A digital camera as recited in claim 1, wherein the luminance correction comprises utilizing color histogram equalization to determine color statistics corresponding to the first and second images, wherein the color histogram equalization comprises:
   transferring the first and second images to a perception-based color space;
   clustering color distributions in the perception-based space;
   performing histogram equalization in the perception-based space; and
   transferring a result of the histogram equalization to a red-green-blue space.

20. A digital camera as recited in claim 1, wherein the luminance correction comprises utilizing spatial region matching to determine a spatial coherence corresponding to the first and second images, wherein the spatial region matching comprises:
   segmenting a blurred one of the first and second images into a plurality of similarly colored regions;
   eroding each of the regions;
   determining a number of iterations to completely erode each region;
   determining a region center for each of the regions;
   sorting the iteration numbers in descending order;
   selecting pixel pairs from the first and second images in matching positions; and
   calculating a neighborhood value for each selected pixel.

21. A digital camera as recited in claim 1, wherein an exposure bracketing feature of a digital camera is utilized to capture the first and second images.

22. A digital camera as recited in claim 1, wherein the scene is selected from a group comprising a high movement scene, a biological matter scene, a dimly lit scene, and a high action scene.

23. A digital camera as recited in claim 1, wherein the digital camera is attached to a device selected from a group comprising a microscope and an electronic microscope.

24. A digital camera as recited in claim 1, further comprising a plurality of image sensors.

25. A digital camera as recited in claim 1, further comprising a plurality of buffers to store data.

26. A digital camera as recited in claim 1, further comprising a shutter that remains open during the capturing of the first and second images.

27. A method comprising:
   exposing an image sensor to a scene;
   capturing a first image of the scene using a first exposure interval;
   capturing a second image of the scene after capturing the first image, the second image of the scene captured using a second exposure interval which is different from the first exposure interval, wherein one of the first and second captured images is underexposed, and wherein one of the first and second captured images is blurred; and
   applying luminance correction to the captured images to generate a resulting image of the scene which appears focused and properly exposed, wherein the application of luminance correction comprises:
  determining a spatial coherence and color statistics of the first and second images; and
  utilizing the determined color statistics and spatial coherence to enhance the underexposed one of the first and second images.

28. A method as recited in claim 27, wherein the first image is underexposed.

29. A method as recited in claim 27, wherein the second image is blurred.

30. A method as recited in claim 27, wherein the luminance correction is applied in accordance with luminance correction instructions stored on a storage device communicationally coupled to the image sensor.

31. A method as recited in claim 27, wherein the luminance correction is applied in accordance with luminance correction instructions stored on a storage device communicationally coupled to the image sensor and data corresponding to the captured images are buffered in one or more storage devices.

32. A method as recited in claim 27, wherein the luminance correction is applied by a processing unit communicationally coupled to the image sensor.

33. A method as recited in claim 27, wherein the luminance correction is applied by an external computing device communicationally coupled to the image sensor.

34. A method as recited in claim 27, wherein the image sensor is implemented in a digital camera.

35. A method as recited in claim 27, wherein
  both the first and second images are captured using an exposure bracketing feature when a shutter button is pressed, wherein the first image is underexposed, and wherein the second image is blurred.

36. A digital camera comprising:
  an image sensor to capture a first image and a subsequent second image of a same scene;
  a storage device to store the captured images; and
  a processing unit coupled to the storage device to enhance one of the first and second captured images with luminance correction;
  wherein the luminance correction comprises utilizing spatial region matching to determine a spatial coherence corresponding to the first and second images, wherein the spatial region matching comprises:
  segmenting a blurred one of the first and second images into a plurality of similarly colored regions;
  eroding each of the regions;
  determining a number of iterations to completely erode each region;
  determining a region center for each of the regions;
  sorting the iteration numbers in descending order;
  selecting pixel pairs from the first and second images in matching positions; and
  calculating a neighborhood value for each selected pixel.

\* \* \* \* \*

UNITED STATES PATENT AND TRADEMARK OFFICE
CERTIFICATE OF CORRECTION

| | | |
|---|---|---|
| PATENT NO. | : 7,463,296 B2 | Page 1 of 1 |
| APPLICATION NO. | : 10/817008 | |
| DATED | : December 9, 2008 | |
| INVENTOR(S) | : Jian Sun et al. | |

It is certified that error appears in the above-identified patent and that said Letters Patent is hereby corrected as shown below:

In column 3, line 40, after "can be" insert -- used to --.

Signed and Sealed this
Tenth Day of May, 2011

David J. Kappos
*Director of the United States Patent and Trademark Office*